Aug. 21, 1951 W. F. R. BRISCOE ET AL 2,565,063
LIQUID COOLED-RADIANT HEAT TREATMENT OF TIRE TREADS
Filed Aug. 16, 1950
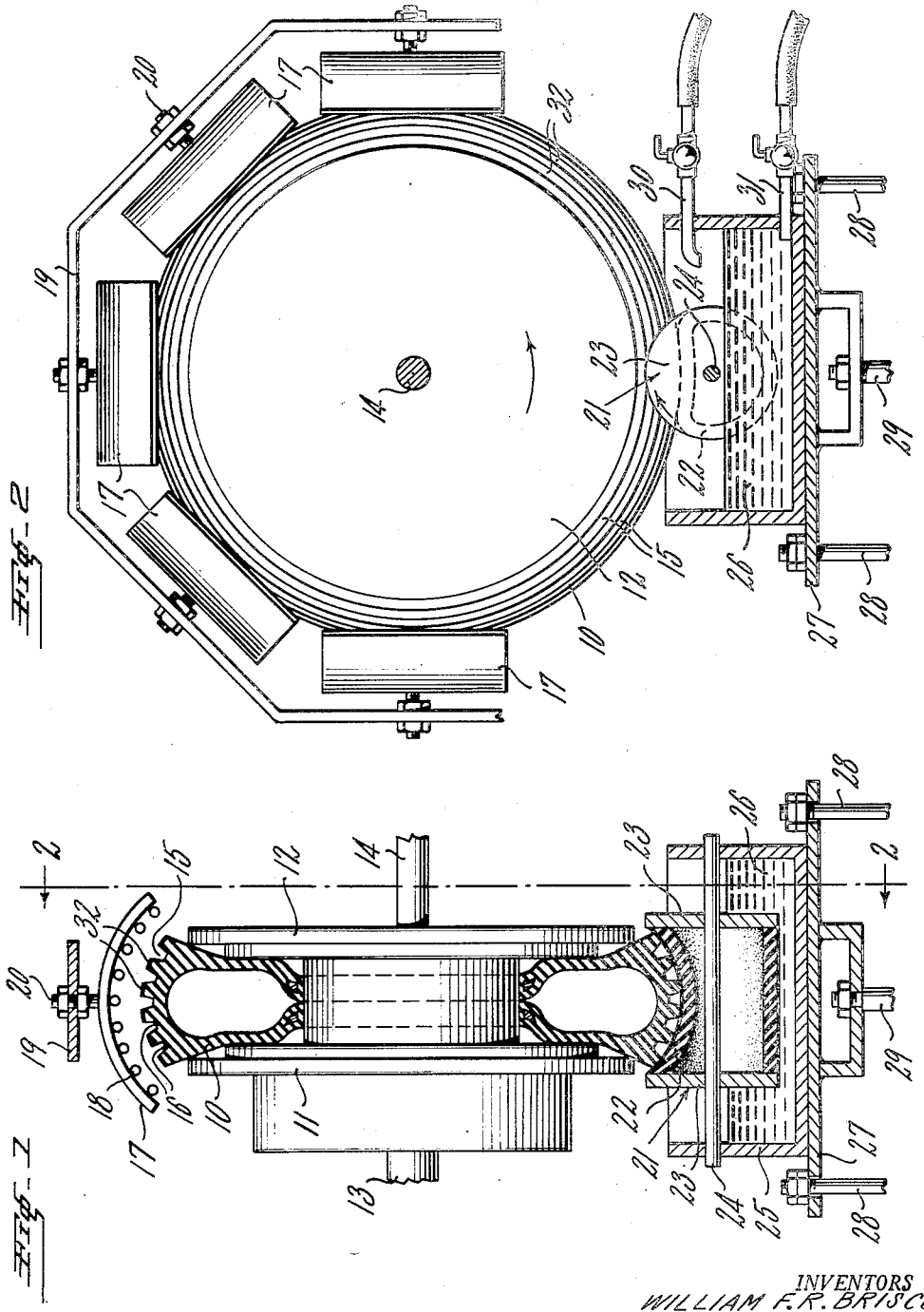
INVENTORS
WILLIAM F. R. BRISCOE
VERNE H. BERRY
BY James J. Long
AGENT

UNITED STATES PATENT OFFICE 2,565,063

LIQUID COOLED-RADIANT HEAT TREATMENT OF TIRE TREADS

William F. R. Briscoe and Verne H. Berry, Detroit, Mich., assignors to United States Rubber Company, New York, N. Y., a corporation of New Jersey Application August 16, 1950, Serial No. 179,862

11 Claims. (Cl. 18—48)

This invention relates to a method of treating rubber articles and more particularly it relates to a new and improved process for treating vulcanized rubber articles with radiant heat to improve their flexing qualities and resistance to cracking.

When a vulcanized rubber article is repeatedly subjected to tensile strain it tends to develop cracks. Thus, for example, pneumatic tires have a tendency to crack at the base of the grooves defining the anti-skid configurations in the tread surface, due to the fact that as the inflated tire rolls along the road the rubber in the tread is repeatedly subjected to an alternating strain as the tread surface meets the surface of the road. This difficulty has been overcome by heat-treating the tread grooves in the manner described in U. S. Patent No. 2,110,224, issued on March 8, 1938, to Glen G. Havens. In such treatment, the tread is stretched to place the rubber of the tread groove bases in a state of tensile strain, and heat is applied to the tread grooves while the tread is thus stretched; as a result of such heat the rubber is softened and released from tension. Thereafter, the rubber is cooled and the tire is allowed to return to its original shape so that the rubber at the base of the grooves is placed in compression as the tire tread is returned to an unstretched condition. Inasmuch as the rubber at the base of the tread grooves of the tire is now normally in a state of compression, flexure of the tire tread during use will not place the rubber of the grooves under undue tension. This inhibits groove cracking and greatly increases the life of the tire.

One method of effecting such heat treatment of the tire grooves is to direct jets of live steam into the groove bases. More recently, it has been desired to effect such treatment by the use of radiant heating as described in co-pending application of William F. R. Briscoe and Robert B. Plummer, Serial No. 68,354, filed December 30, 1948, now Patent No. 2,546,085, and assigned to the same assignee as the instant application. In the course of such radiant heat treatment it is desirable to heat the groove bases only, while protecting the road-contacting surface of the tread from exposure to the heat, since such heat would have an adverse effect on the abrasion-resistance and appearance of the tread surface.

The principal object of the invention is to provide an improved method for selectively applying radiant heat to the groove bases only, while protecting the remainder of the tread surface from the heat.

Other objects and advantages of the invention will be made evident in the following detailed description, when read in reference with the accompanying drawing, wherein:

Fig. 1 is a front elevational view, with parts in section, of an apparatus adapted to carry out the method of the invention; and, Fig. 2 is a side elevational view, partly in section, of the apparatus taken along the line 2—2 of Fig. 1.

The invention contemplates treating a vulcanized rubber article, such as a pneumatic tire, having grooves or indentations in its surface, by distorting such article to produce tensile strains in the bases of the grooves or indentations, and selectively subjecting the bases only of the grooves or indentations to radiant heat, while protecting the remainder of the rubber surface from the heat by maintaining on such remaining surface a film of cooling liquid. The cooling liquid employed is sufficiently volatile so that evaporation from the rubber surface takes place, and such evaporation dissipates the radiant heat, thereby preventing the liquid-coated surface from becoming excessively hot. Such cooling liquid preferably comprises principally water, because the high latent heat of vaporization of water provides for removal of relatively large quantities of heat, thereby permitting the groove bases to be subjected to relatively intense radiant heating without scorching the outer surface of the article, and thereby making it possible to carry out the treatment rapidly.

It has been found that in the treatment of pneumatic tires, an aqueous cooling liquid can be applied and maintained on the tread surface of the tire in the form of a continuous protective film containing a sufficient quantity of liquid to effect the desired degree of evaporative cooling, and without entering the groove bases where cooling is not desired, provided the viscosity of the applied aqueous liquid is of the order of 6 centipoises at 25° C. Extensive tests have shown that the preferred operative range for the viscosity of the aqueous cooling liquid is from 3 centipoises to 12 centipoises at 25° C. Liquids having viscosities lower than 3 centipoises tend to leave uncoated areas on the tread surface, with the result that such areas are exposed to the full effect of the radiant heat. Such an exposure to the full effect of the radiant heat can cause a decrease in the abrasion-resistance of the rubber of the tread surface with the result that the life of the tire tread is shortened, or such an exposure can result in unsightly discoloration or scorching of the surface. Also, a low viscosity cooling liquid, when applied in sufficient quantity to give at least partial protection, will tend to run off of the surface into the groove bases and prevent adequate treatment in such areas. On the other hand, aqueous treating liquids having a viscosity appreciably greater than 12 centipoises tend to foul the treating equipment, and also tend to wet the groove bases with the result that the bases are inadequately heat-treated.

Aqueous cooling liquids having the desired viscosity and suitable for use in the invention may be obtained by adding to ordinary water substances which will increase the viscosity thereof. Organic or inorganic materials which are not deleterious to the rubber may be added to water to form an aqueous cooling liquid of the desired viscosity. The higher molecular weight organic materials which are soluble or dispersable in water are advantageous for this purpose. For example, a 50% (by weight) aqueous solution of sugar, or a 1.5% aqueous solution of starch may be employed with satisfactory results. More preferably, organic polymeric materials are employed because relatively small amounts of such materials added to water produce a relatively great increase in viscosity. Water soluble cellulose derivatives, such as cellulose esters or ethers, are especially preferred organic polymeric materials. Thus, for example, sodium carboxy methyl cellulose of the usual commercial grade, when dissolved in water, has a viscosity of about 3 centipoises at 25° C. at 0.06% (by weight) concentration, and has a viscosity of about 12 centipoises at 25° C. at about 0.105% concentration. Another organic material which is particularly suitable is the commercially available cellulose ether product marketed under the trade name "Methocel." The grade of Methocel known as the 4000 centipoise grade has a viscosity of 3 centipoises at 25° C. at 0.18% concentration, and a viscosity of 12 centipoises at 25° C. at about 0.46% concentration. Since Methocel becomes insoluble in water at elevated temperature, one precaution that must be observed when employing this material is that the temperature of the supply of aqueous cooling liquid should not be permitted to rise too high; the solution should be maintained below about 150° F. Polyvinyl alcohol is another preferred organic polymeric material that can be used to increase the viscosity of the water. Other suitable organic polymeric materials that can be added to water to increase the viscosity thereof are known to those skilled in the art, and the invention contemplates the use of any such materials.

In the accompanying drawing we show an apparatus adapted to carry out the method of the invention. In such apparatus a pneumatic tire casing 10 is supported between two separable flange members 11 and 12 supported on shafts 13 and 14 respectively, which distort the tire casing from its normal cross-sectional shape so as to open up the tread grooves 15, producing tension in the bases 16 of the grooves. The flange members 11 and 12, and the tire casing 10, may be rotated as a unit about the shafts 13 and 14 by suitable means (not shown) in the course of the treatment. The apparatus for thus supporting and rotating the tire in the distorted condition is disclosed in detail in U. S. Patent No. 2,193,119, issued to Milo Bailey on March 12, 1940.

While in such strained condition the tread groove bases are subjected to relatively intense radiant heat by a plurality of radiant heaters 17 arranged around the greater portion of the periphery of the tire in close proximity thereto. The radiant heaters 17 include electrical resistance heating element 18, and they are shaped and positioned so as to most effectively direct heat into the grooves. The radiant heaters are supported from a suitable surrounding frame 19 by means of rods 20.

Disposed below the tire supporting assembly there is a horizontal transfer roller 21 comprising a hollow cylinder of resilient material 22 mounted on vertical side flanges 23. The upper surface of the resilient cylinder 22 conforms to the contour of the surface of the tire at the area of contact. The transfer roller 21 rotates on a shaft 24 supported at each end in opposite walls of a trough 25 adapted to contain an aqueous cooling liquid 26 of the character described previously. The lower portion of the transfer roller 21 is immersed in the liquid 26. The roller 21 is adapted to be moved vertically into or out of engagement with the tire tread surface, by raising or lowering a supporting platform 27 on which the trough 25 carrying the roller 21 rests. The platform 27 may be raised or lowered on guide rods 28 at the sides of the platform by means of a hydraulic mechanism (not shown) connected to a rod 29 attached to the under side of the platform, as is disclosed in U. S. Patent No. 2,193,119 referred to above.

The cooling liquid may be introduced to the trough 25 from a suitable supply source (not shown) through a pipe 30 disposed above the trough, and an outlet pipe 31 near the bottom of the trough serves for removing the liquid.

In operation, the platform 27 is initially in a lowered position and the flange 12 is moved away from the flange 11 to permit mounting the tire in the apparatus. The tire 10 is placed on the flange 12, which is then moved into engagement with the flange 11 to distort the tire, and the platform 27 is raised to bring the transfer roller 19 into contact with the surface of the tire tread. The tire 10 is then rotated, causing rotation of the transfer roller 21 in contact therewith. The transfer roller continuously picks up on its surface a film of the aqueous cooling liquid 26 in which it is immersed, and continually transfers such liquid to the outer surface of the rotating tire in the form of a continuous film 32. At the same time radiant heat is directed onto the tire surface from the heaters 17. Under the influence of the heat, the water in the film 32 of aqueous cooling liquid evaporates, thereby dissipating heat and preventing the tread surface from becoming unduly hot. At the same time the groove bases, which are not covered by a protective film, become heated, thereby softening the rubber and relieving the strains induced in the groove bases by supporting the tire in the distorted position. As the water evaporates from the film 32 in the course of the treatment, such film is continually renewed by the transfer roller 21 as the tire revolves in contact therewith. In a typical treatment the tire may be rotated at a rate of 7½ R. P. M. over a period of about 2¾ minutes, during which time the temperature of the groove bases may attain an estimated 450° F., while the temperature of the tread surface itself does not rise above an estimated 220° F. From this it can be calculated that the cooling effect of the film 31 is such that it absorbs about 970 B. t. u., corresponding to the evaporation of about one pound of water from the tread surface.

At the conclusion of the heating, the tire is cooled, as by spraying with cold water or by directing a stream of air thereover, and it is then removed from the apparatus, whereupon it returns to its normal shape. The effect of the treatment is to put the rubber of the groove bases in a state of compression, so that subsequently applied stresses do not produce as much tensile strain in the groove bases as in the case of untreated tires. Cracking of the groove bases is thereby significantly reduced.

By the practice of the invention as described it is possible to apply intense radiant heating to the groove bases without danger of scorching the tread surface. Therefore the heat treatment can be carried out rapidly and effectively without danger of decreasing the abrasion-resistance of the tread surface, or spoiling its appearance.

By employing an aqueous cooling medium in the manner of the invention, highly effective cooling of the tread surface is made possible, due to the latent heat of vaporization absorbed as the cooling liquid continually evaporates during the course of the treatment. By continually renewing the cooling film on the surface throughout the treatment, satisfactory protection of the surface from overheating is assured, even toward the end of the treatment.

The use of an aqueous medium of proper viscosity makes it possible to produce on the tread surface a continuous film covering all of the tread surface, but at the same time leaving the groove bases exposed. In this way the radiant heat is made to act selectively on the groove bases, without affecting the tread surface itself.

A further advantage of employing a relatively viscous aqueous cooling liquid is that such relatively high viscosity makes it possible to apply and maintain on the tread surface in the form of a continuous film relatively greater quantities of cooling liquid than it would be possible to apply in the form of a film if the liquid were more mobile. For this reason, intense radiant heat can be applied around the greater portion of the periphery of the tire without danger of the cooling film drying out completely as the tire surface rotates through the heated zone.

The method can be carried out economically, since only small amounts of material need be added to ordinary water to produce a cooling liquid of the desired viscosity.

Having thus described our invention, what we claim and desire to protect by Letters Patent is:

1. A method of treating a vulcanized rubber article having portions indented from the outer surface of the article, such portions being subject to cracking on flexing, comprising the steps of deforming the article to stretch the rubber at the bottom of the indentations, exposing the article to radiant heat, concurrently applying a liquid cooling film to the outer surface only of the article, whereby the radiant heat softens the rubber at the bottom of the indentations without scorching the outer surface of the article, cooling the article, and releasing the stretched rubber, so that the rubber at the bottom of the indentations is placed under compression.

2. A method of treating a vulcanized rubber tire having a grooved design in the tread surface comprising the steps of deforming the tire to stretch the rubber at the bottom of the tread grooves, applying a film of cooling liquid to the tread surface, concurrently applying radiant heat to the tread to soften the rubber at the bottom of the grooves, cooling the thus-treated tire, and releasing the stretched rubber so that the rubber of the groove bases is placed under compression.

3. A method of treating a vulcanized rubber tire having grooves in its tread surface comprising the steps of deforming the tire to stretch the rubber in the groove bases, subjecting the tire tread to radiant heat while continually applying a film of aqueous cooling liquid to the tread surface but not to the groove bases, whereby the radiant heat softens the rubber at the groove bases only, cooling the thus treated tire, and releasing the stretched rubber.

4. A method of treating a vulcanized rubber tire having grooves in its tread surface comprising the steps of deforming the tire to subject the rubber of the groove bases to tensile strain, exposing the tire tread to radiant heat to soften the rubber of the groove bases, continually applying a film of aqueous cooling liquid having a viscosity within the range from 3 to 12 centipoises at 25° C. to prevent scorching of the tread surface, cooling the thus-treated tire, and releasing the tire from the deformed condition.

5. A method as in claim 4 in which the cooling liquid is an aqueous solution of organic polymeric material.

6. A method as in claim 4 in which the cooling liquid is an aqueous solution of a cellulose ether.

7. A method as in claim 4 in which the cooling liquid is an aqueous solution of methyl cellulose.

8. A method as in claim 4 in which the cooling liquid is an aqueous solution of sodium carboxy methyl cellulose.

9. A method as in claim 4 in which the cooling liquid is an aqueous solution of polyvinyl alcohol.

10. A method of treating a vulcanized rubber tire having grooves in its tread surface comprising mounting the tire for rotation with the tire distorted in cross-section so as to produce tensile strain in the bases of the tread grooves, rotating the tire, subjecting the tread surface of the tire during rotation to radiant heat, applying a thin film of an aqueous cooling medium to the outer surface of the tread without applying said medium to the groove bases, said film serving to cool the outer surface of the tread by evaporation of the water therein while permitting the radiant heat to soften the rubber of the groove bases, continually replenishing said film as the tire revolves, cooling the thus-treated tire, and releasing the tire from said distorted state.

11. A method of treating a vulcanized rubber tire having grooves in its tread surface comprising mounting the tire for rotation with the tire distorted in cross-section so as to produce tensile strain in the bases of the tread grooves, rotating the tire, subjecting the tread surface of the tire during rotation to radiant heat, contacting the tread surface with a transfer roller providing a supply of aqueous cooling liquid having a viscosity in the range of from 3 to 12 centipoises at 25° C. to produce a continuous film of cooling liquid over the entire outer surface of the tread without applying said liquid to the groove bases, said film serving to cool the outer surface of the tread by evaporation of the water therein without cooling the groove bases, thereby permitting the radiant heat to soften the rubber of the groove bases, continually replenishing said film as the tire revolves, cooling the thus-treated tire, and releasing the tire from said distorted state.

WILLIAM F. R. BRISCOE.
VERNE H. BERRY.

No references cited.